US012769191B2

(12) United States Patent
Ma et al.

(10) Patent No.: US 12,769,191 B2
(45) Date of Patent: Oct. 20, 2026

(54) SELF-ADJUSTING SHOCK-ABSORPTION DEVICE

(71) Applicant: TILTA INC., Burbank, CA (US)

(72) Inventors: Long Ma, Shenzhen (CN); Yaolong Luo, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 129 days.

(21) Appl. No.: 18/917,778

(22) Filed: Oct. 16, 2024

(65) Prior Publication Data

US 2025/0123542 A1 Apr. 17, 2025

(30) Foreign Application Priority Data

Oct. 17, 2023 (CN) ........................ 202322796497.X

(51) Int. Cl.

| | |
|---|---|
| ***H04N 5/335*** | (2011.01) |
| ***F16F 7/00*** | (2006.01) |
| ***G03B 17/56*** | (2021.01) |

(52) U.S. Cl.

CPC .............. *G03B 17/561* (2013.01); *F16F 7/00* (2013.01)

(58) Field of Classification Search

CPC ......................................................... F16F 7/00

See application file for complete search history.

(56) References Cited

U.S. PATENT DOCUMENTS

| | | | | |
|---|---|---|---|---|
| 4,208,028 A * | 6/1980 | Brown | .................. | G03B 13/00 396/421 |
| 8,077,212 B2 * | 12/2011 | Chapman | ............. | B66F 11/048 396/419 |
| 2024/0181971 A1 * | 6/2024 | Zeng | ...................... | B60R 11/04 |

FOREIGN PATENT DOCUMENTS

| | | |
|---|---|---|
| CN | 109798422 A * | 5/2019 |
| CN | 218294312 U | 1/2023 |

* cited by examiner

*Primary Examiner* — Gary C Vieaux

(74) *Attorney, Agent, or Firm* — LOZA & LOZA, LLP; Derek W. Yeung

(57) ABSTRACT

The present disclosure pertains to the technical realm of photographic equipment, introducing a self-adjusting shock-absorption device that incorporates a movable frame and a shock-absorption mechanism. The movable frame is designed to rotate along at least one pivot. The shock-absorption mechanism comprises an adjusting component and an elastic component, where the elastic component is flexibly positioned within the movable frame, with at least one of its ends linked to the adjusting component. The end of the adjusting component, distant from the elastic component, is also movably attached to the movable frame. As the movable frame rotates along its pivot, the adjusting component dynamically shifts, resulting in a modulation of the elastic component's length.

12 Claims, 8 Drawing Sheets

SELF-ADJUSTING SHOCK-ABSORPTION DEVICE

CROSS-REFERENCE TO RELATED APPLICATIONS

The present application for patent claims priority to and the benefit of pending Chinese Application No. 202322796497X, filed Oct. 17, 2023, and hereby expressly incorporated by reference herein as if fully set forth below in its entirety and for all applicable purposes.

TECHNICAL FIELD

The present disclosure pertains to the realm of photographic equipment, specifically addressing a self-adjusting shock-absorption device.

INTRODUCTION

In both indoor and outdoor motion photography settings, maintaining image stability is paramount for capturing clear shots. Consequently, shock-absorption structures are often employed to support cameras and enhance shooting stability. A widespread approach involves installing a metal spring with a movable bracket designed for vertical tilting. The spring, connected at both ends to the bracket, provides cushioning during its movement. Nevertheless, prolonged use under load can diminish the shock-absorption effectiveness, and metal springs are prone to fatigue and loosening, compromising their ability to effectively dampen jitters and vibrations during photography.

BRIEF SUMMARY

Aspects of this disclosure provide a self-adjusting shock-absorption device that addresses the limitations encountered in prior art solutions, as prolonged use under load can diminish the shock-absorption effectiveness, and metal springs are prone to fatigue and loosening, compromising their ability to effectively dampen jitters and vibrations during photography.

To overcome the aforementioned technical challenges, the present disclosure offers the following technical solution:

A self-adjusting shock-absorption device comprising:

a movable frame capable of rotating along at least one a pivot, a shock-absorption mechanism, comprising an adjusting component and an elastic component, where the clastic component is provided within the movable frame, with at least one an end of the elastic component connected to the adjusting component; one end of the adjusting component, distant from the clastic component, is movably connected to the movable frame; upon rotation of the support frame, the adjusting component undergoes dynamic motion, changing a length of the elastic component.

wherein the adjusting component comprises a first adjusting member and a second adjusting member, the first adjusting member is movably provided at a first end of the movable, the second adjusting member is movably provided at a second end of the movable frame; the elastic component is interconnected between the first adjusting member and the second adjusting member; upon rotation of the support frame, the first adjusting member and second adjusting member undergoes dynamic motion, altering the elastic component's length in a coordinated manner.

wherein the first adjusting member comprises a swinging component and a sliding shaft; the swinging component is movably connected to the movable frame and connected to the elastic component; this swinging component features a sliding groove; a first end of the sliding shaft is connected to the movable frame, and a second end of the sliding shaft slides smoothly within the sliding groove; upon rotation of the support frame, the sliding shaft rotates along the groove, driving the swinging component to pivot and thereby altering the elastic component's length.

wherein the sliding groove comprises a first groove portion in an arc shape and a second groove portion in an eccentric arc shape.

wherein the movable frame comprises a four-link assembly movably; an end of the swinging component, positioned away from a second arm of the four-link assembly, is movably connected to a first arm of the four-link assembly via a fourth arm of four-link assembly; a first end of the second adjusting member is movably connected to a third arm of the four-link assembly, and a second end of the second adjusting member is connected to the fourth arm of the four-link assembly; when the four-link assembly swings downwards, stretching the elastic component, the sliding shaft slides into the first groove portion; when the assembly swings upwards, contracting the clastic component, the sliding shaft moves into the second groove portion, prompting the swinging component to pivot in a direction that further stretches the elastic component.

wherein the sliding groove comprises a first groove portion in an eccentric arc shape and a second groove portion in an eccentric arc shape.

wherein the movable frame comprises a four-link assembly movably; an end of the swinging component, positioned away from a second arm of the four-link assembly, is movably connected to a first arm of four-link assembly via a fourth arm of four-link assembly; a first end of the second adjusting member is movably connected to a third arm of the four-link assembly, and a second end of second adjusting member is connected to the fourth arm of the four-link assembly; when the four-link assembly swings downwards, stretching the clastic component, the sliding shaft slides into the first groove portion, driving the swinging component to move in a direction of compressing the elastic component; when the assembly swings upwards, compressing the elastic component, the sliding shaft moves into the second groove portion, prompting the swinging component to pivot in a direction that further stretches the elastic component.

wherein the second adjusting member comprises a first connecting rod and a second connecting rod; the first connecting rod and the second connecting rod are interconnected at a first end with a rotating connection, while a second end of the first connecting rod and the second connecting rod is respectively connected to the movable frame; the elastic component is connected at a juncture point where the first connecting rod and the second connecting rod; upon rotation of the support frame, the first connecting rod and the second connecting rod undergo relative rotation, subsequently altering a length of the elastic component.

wherein the movable frame comprises a four-link assembly movably; one end of the swinging component, positioned away from a second arm of the four-link assembly, is movably connected to a first arm of the four-link assembly via a fourth arm of the four-link assembly; one end of the first connecting rod, distanced from the second connecting rod, is movable attached to the third arm of the four-link assembly; one end of the second connecting rod, distanced from the first connecting rod, is movably connected to the fourth arm of the four-link assembly; when the four-link assembly swings downwards, expanding the elastic component, the third and fourth arms facilitate the rotation of the first and second connecting rods, causing the juncture point to shift in a direction that compresses the elastic component; and, when the four-link assembly swings upwards, contracting the elastic component, the third and fourth arms drive the rotation of the first and second connecting rods, resulting in the juncture point moving towards a position that elongates the elastic component.

wherein a first force adjustment assembly is positioned at a first end of the elastic component, remote from the first adjusting member; a second end of the force adjustment assembly, remote from the elastic component, is connected to the second adjusting member.

wherein a second force adjustment assembly is situated at one end of the elastic component, remote from the second adjusting member; this second force adjustment assembly comprises an adjusting member positioned on the first adjusting member, and a connector with a first end firmly attached to the elastic component and a second end movably engaged around the adjusting member.

Beneficial Effects

In some aspects, the movable frame is designed to rotate along at least one pivot, triggering a subsequent alteration in the expansion and contraction of the elastic component as it rotates. In tandem with this rotation, the adjusting component dynamically adjusts its position to accommodate the changing length of the elastic component. In short, during the rotation of the movable frame, the adjusting component is movably connected to at least one end of the elastic component, enabling it to seamlessly adapt to the movement. This dynamic adaptation not only cushions the elastic component to a certain extent but also enhances its balancing capabilities to accommodate the elastic strain rate of the component. The self-adaptive adjustment feature ensures a smoother fluctuation linearity of the elastic component, significantly improving the shock-absorption device's responsiveness to vibrations. Consequently, it effectively filters out higher-frequency vibrations. This design significantly minimizes or eliminates metal fatigue within the elastic component, which could otherwise hinder its ability to effectively dampen vibrations during camera shooting. In essence, the shock-absorption device presented in this embodiment offers a more efficient and sustained means of cushioning jitters encountered during photography.

BRIEF DESCRIPTION OF THE DRAWINGS

To facilitate a comprehensive understanding of the technical solutions embodied in the present disclosure and the prior art, a concise overview of the drawings pertinent to the description of exemplary embodiments or prior art will be provided. It is important to note that the drawings presented below serve as illustrative examples of the present application and should not be construed as exhaustive. Ordinary practitioners in the field can readily derive alternative drawings based on the structural configurations depicted herein, without the need for inventive endeavors.

ILLUSTRATION OF ELEMENTS

Figure 1:
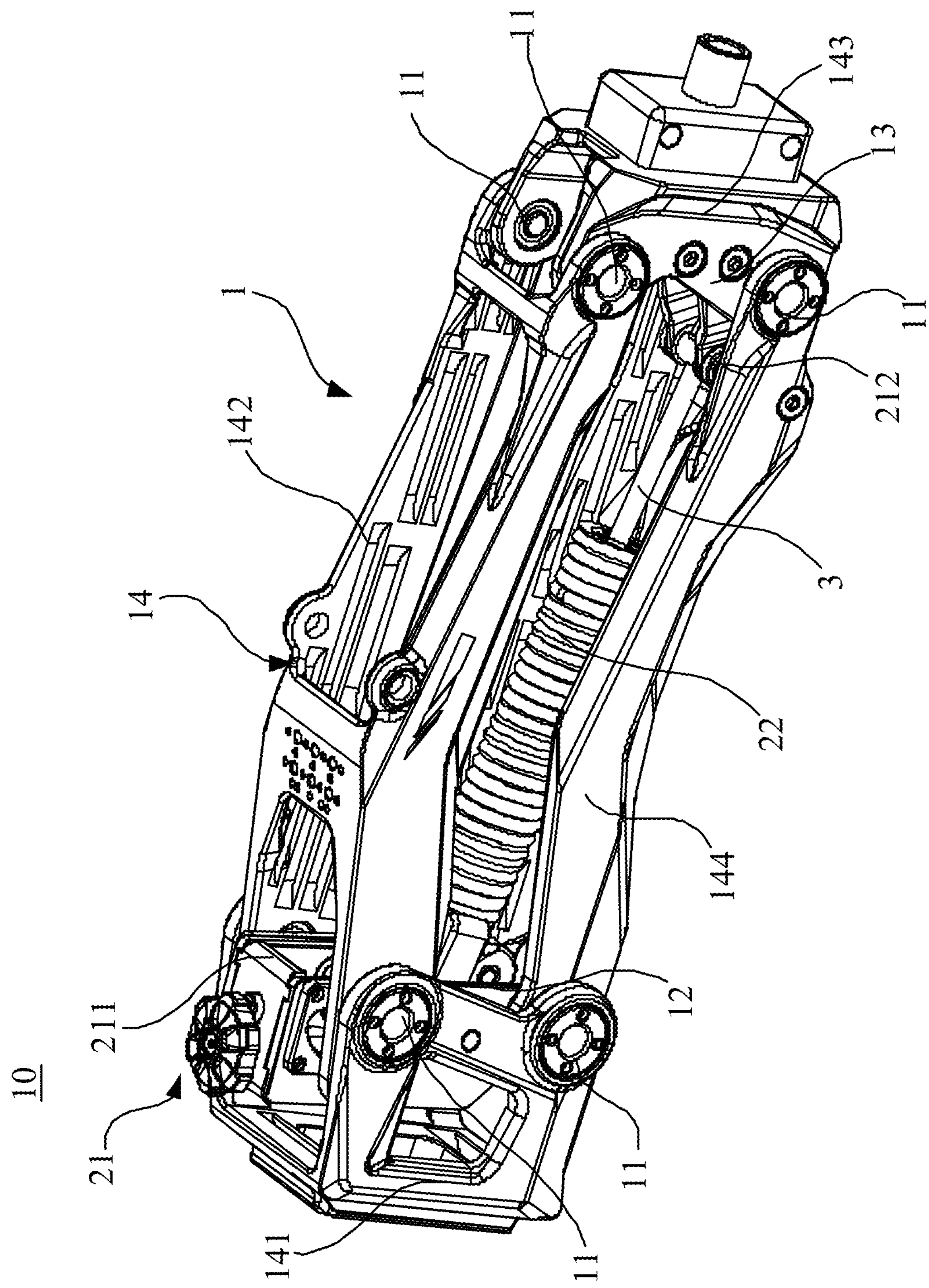
FIG. 1 is a diagram of an exemplary shock-absorption device according to some aspects of the disclosure.

10—shock-absorption device;

1—movable frame; 11—pivot; 12—first end; 13—second end; 14—four-link assembly; 141—first arm; 142—second arm; 143—third arm; 144—fourth arm;

2—shock-absorption mechanism; 21—adjusting components; 211—first adjusting member; 2111—swinging component; 2112—sliding shaft; 21121—sliding wheel; 2113—sliding groove; 21131—first groove portion; 21132—second groove portion; 21133—limiting protrusion; 212—second adjusting member; 2121—first connecting rod; 2122—second connecting rod; 2123—connecting shaft; 22—elastic component;

3—first force adjustment assembly;

4—second force adjustment assembly; 41—adjusting member; 411—rotating portion; 43—connector; 431—first mounting hole; 432—second mounting hole;

5—rod body.

The objectives, functional characteristics, and aspects of this application shall be further expounded upon through a detailed examination of exemplary embodiments and the accompanying drawings.

DETAILED DESCRIPTION

The subsequent passages provide a precise and exhaustive portrayal of the technical solutions embodied within this application, drawing upon the illustrative figures. It is to be understood that the enumerated embodiments constitute but a fraction of the broader scope and are not exhaustive. Consequently, any alternative embodiments derived by ordinary technicians in the relevant field, without the necessity for inventive ingenuity, are encompassed within the protective ambit of this application.

Please be advised that directional terminology (e.g., up, down, left, right, front, rear, etc.) employed in the embodiments serves exclusively to elucidate the relative positional arrangements and dynamic states among components within a specific orientational framework as depicted in the drawings. In the event of a change in this orientational framework, the directional designations will naturally align with the new configuration.

Furthermore, the utilization of ordinal indicators such as "first," "second," and so forth, in this application, is purely for descriptive clarity and cannot be misconstrued as signifying relative significance or implicitly indicating the number of technical features referenced. As such, expressions constrained by such ordinal designations may encompass one or more of the indicated features, either explicitly or implicitly. Moreover, the phrase "and/or" used throughout this document encompasses three distinct possibilities: Taking A and B as examples, it embraces the technical solution exclusive to A, the technical solution exclusive to B, as well as the technical solution that concurrently satisfies both A and B. Additionally, the integration of technical solutions across distinct embodiments is permissible, albeit contingent upon the feasibility of such integration by ordinary technicians in the field. In instances where the combined technical solutions conflict or are unfeasible, such integrations are deemed non-existent and thereby excluded from the scope of protection afforded by this application.

Referring to FIGS. 1-8, a shock-absorption mechanism 10 is disclosed by this application, incorporating a movable frame 1 and a shock-absorption mechanism 2. The shock-absorption mechanism 2 includes an adjusting component 21 and an elastic component 22, where the clastic component 22 is flexibly positioned within the movable frame 1, with at least one of its ends linked to the adjusting component 21. The end of the adjusting component 21, distant from the elastic component 22, is can be movably attached to the movable frame 1. As the movable frame 1 rotates, the adjusting component 21 dynamically shifts, resulting in a modulation or change of the length of the elastic component 22.

Figure 2:
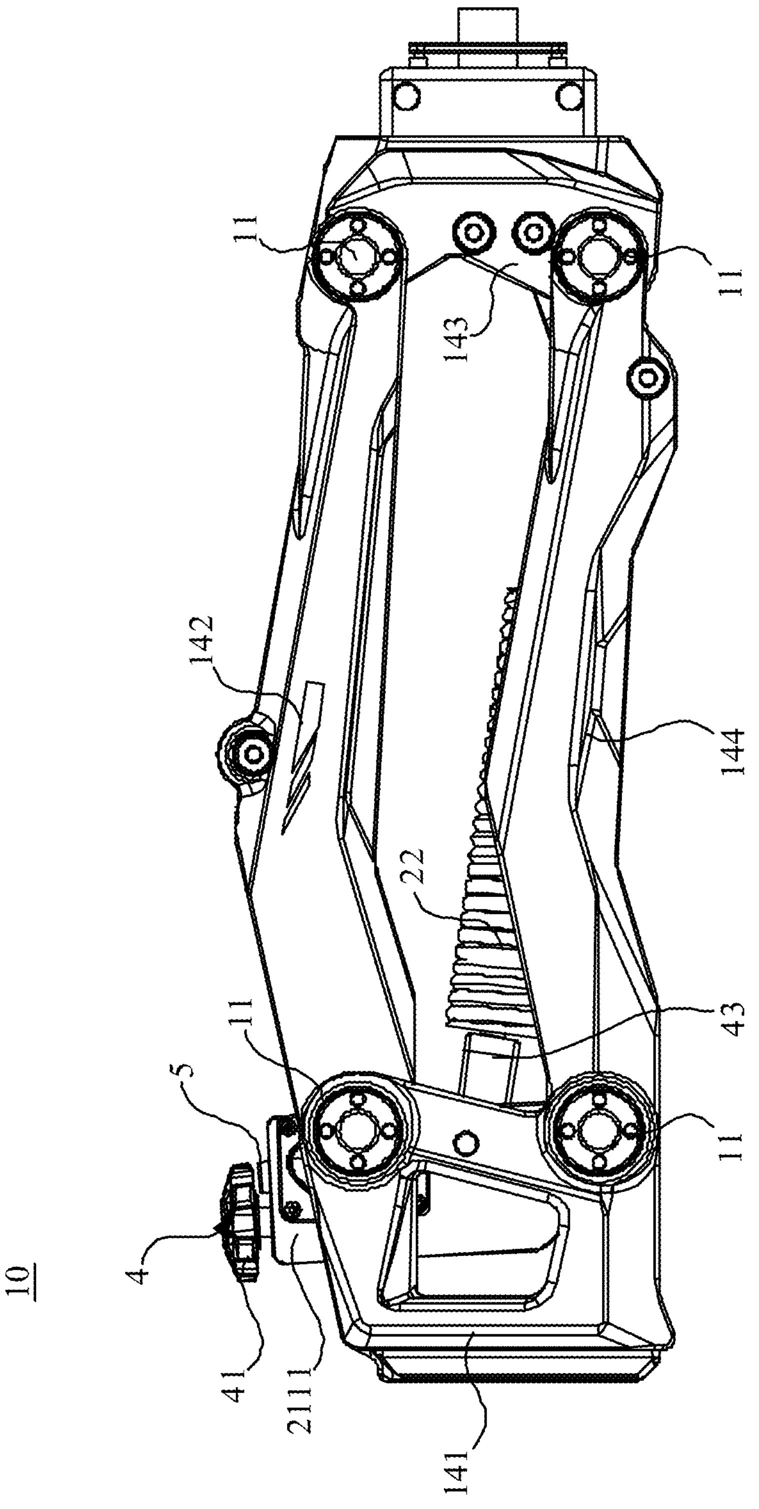
FIG. 2 is a front view of the shock-absorption device of FIG. 1.

In some aspects, the movable frame 1 can rotate along at least one pivot 11 (e.g., four pivots 11 shown FIG. 2). As the movable frame 1 rotates, the elastic component 22 undergoes corresponding extension and contraction, and the adjustment component 21 dynamically adapts to this change, accommodating the varying length of the elastic component 22. For example, the movable frame 1 can feature four adjustable angles corresponding to four pivots 11, allowing its shape to be dynamically modified while maintaining opposite sides that remain parallel. During the rotation of the movable frame 1, the adjusting component 21 is movably connected to at least one end of the elastic component 22, enabling it to seamlessly adapt to the movement. This dynamic adaptation not only cushions the elastic component 22 to a certain extent but also enhances its balancing capabilities to accommodate the clastic strain rate of the component. The self-adaptive adjustment feature ensures a smoother fluctuation linearity of the elastic component 22, significantly improving its responsiveness to vibrations. Consequently, it effectively filters out higher-frequency vibrations. This design significantly minimizes or eliminates metal fatigue within the elastic component 22, which could otherwise hinder its ability to effectively dampen vibrations during camera shooting. In essence, the shock-absorption device 10 presented in this embodiment offers a more efficient and sustained means of cushioning jitters encountered during photography.

It is understandable that in a specific embodiment, the adjusting component 21 may be positioned at one end of the elastic component 22, enabling that end to self-adjust and accommodate the elastic strain rate of the component 22. Alternatively, in another embodiment, adjusting components 21 can be situated at both ends of the elastic component 22, granting both ends self-adjusting capabilities for improved adaptation to the elastic strain rate when the movable frame 1 rotates. This configuration results in smoother linear fluctuation of the elastic component 22 and enhances the responsiveness of the shock-absorption device 10 to vibrations. For the purpose of this application, the subsequent explanation will focus on the scenario where adjustment components 21 are positioned at both ends of the elastic component 22:

The adjusting component 21 can include a first adjusting member 211, a second adjusting member 212, and the elastic component 22. The elastic component 22 is movably interconnected between the first and second adjusting members 211 and 212. The first adjusting member 211 is mounted in a movable manner at the first end 12 of the movable frame 1, while the second adjusting member 212 is similarly mounted at the second end 13 of the frame. Both adjusting members 211 and 212 can dynamically move (e.g., shift) in response to the rotation of the movable frame 1, altering the length of the elastic component 22 as the frame rotates.

In some aspects, the movable frame 1 is designed to rotate around at least one pivot 11 (e.g., four pivots 11 are shown in the drawings). As the movable frame 1 rotates, the clastic component 22 undergoes corresponding extension or contraction, while the first and second adjusting members 211 and 212 dynamically adjust their positions in response, adapting to the changing length of the elastic component 22. During the rotation of the movable frame 1, the first and second adjusting members 211 and 212 are flexibly attached to both ends of the elastic component 22, enabling it to seamlessly adapt to the movement. This dynamic adaptation not only cushions the elastic component 22 to a certain extent but also enhances its balancing capabilities to accommodate the clastic strain rate of the component. This design significantly minimizes or eliminates metal fatigue within the elastic component 22, which could otherwise hinder its ability to effectively dampen vibrations during camera shooting. In essence, the shock-absorption device presented in this embodiment offers a more efficient and sustained means of cushioning jitters encountered during photography.

Figure 3:
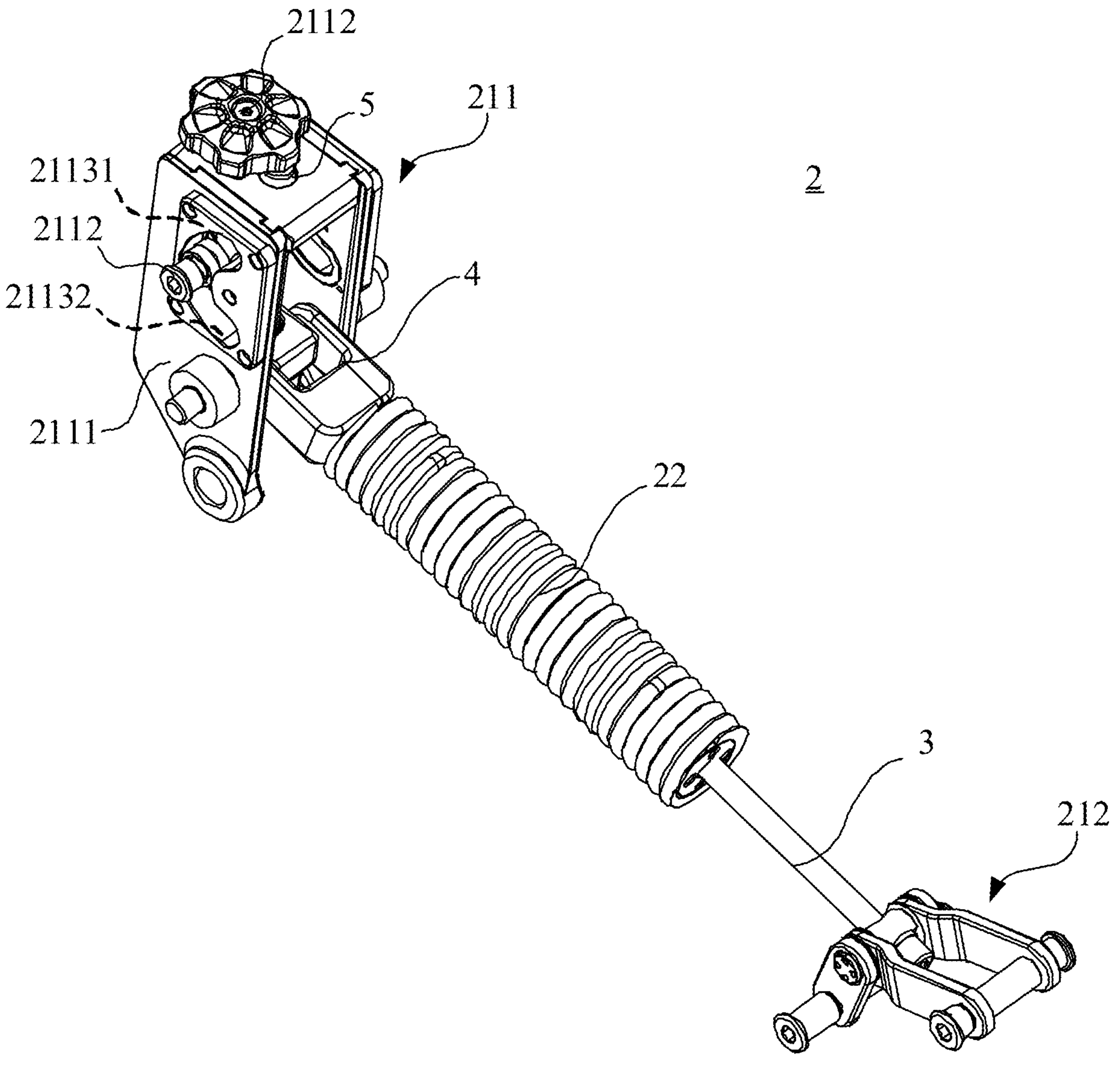
FIG. 3 is a diagram illustrating an exemplary adjusting component according to some aspects of the disclosure.

Referring to FIG. 3, the first and second adjusting members 211 and 212 can be eccentric movement mechanisms or linkage structures capable of inducing interconnected movements. This ensures that as the movable frame 1 rotates, both adjusting components 211 and 212 move dynamically.

The first adjusting member 211 includes a swinging component 2111 and a sliding shaft 2112. The swinging component 2111 is mounted on the movable frame 1 in a movable fashion and is connected to the elastic component 22. A sliding groove 2113 is incorporated into the swinging component 2111, with one end of the sliding shaft 2112 secured to the movable frame 1 and the other end sliding within the groove 2113. As the movable frame 1 rotates, the sliding shaft rotates along the contour of the sliding groove 2113, prompting the swinging component 2111 to swing and consequently alter the length of the elastic component 22. In this embodiment, the trajectory of the sliding groove 2113 can be tailored to suit the desired swinging range of the swinging component 2111. This arrangement allows the sliding shaft 2112 to traverse the sliding groove 2113 in a manner that corresponds to the frame's rotation, resulting in varying swing amplitudes of the swinging component 2111 and, consequently, a modulated adjustment of the length of the elastic component 22. This design not only cushions the elastic component 22 to a certain extent but also enhances its balancing capabilities to accommodate the clastic strain rate of the component. It is recognized that the trajectory of the sliding groove 2113 can dictate an eccentric arc-like motion path for the sliding shaft 2112, among other possible motion patterns.

Figure 4:
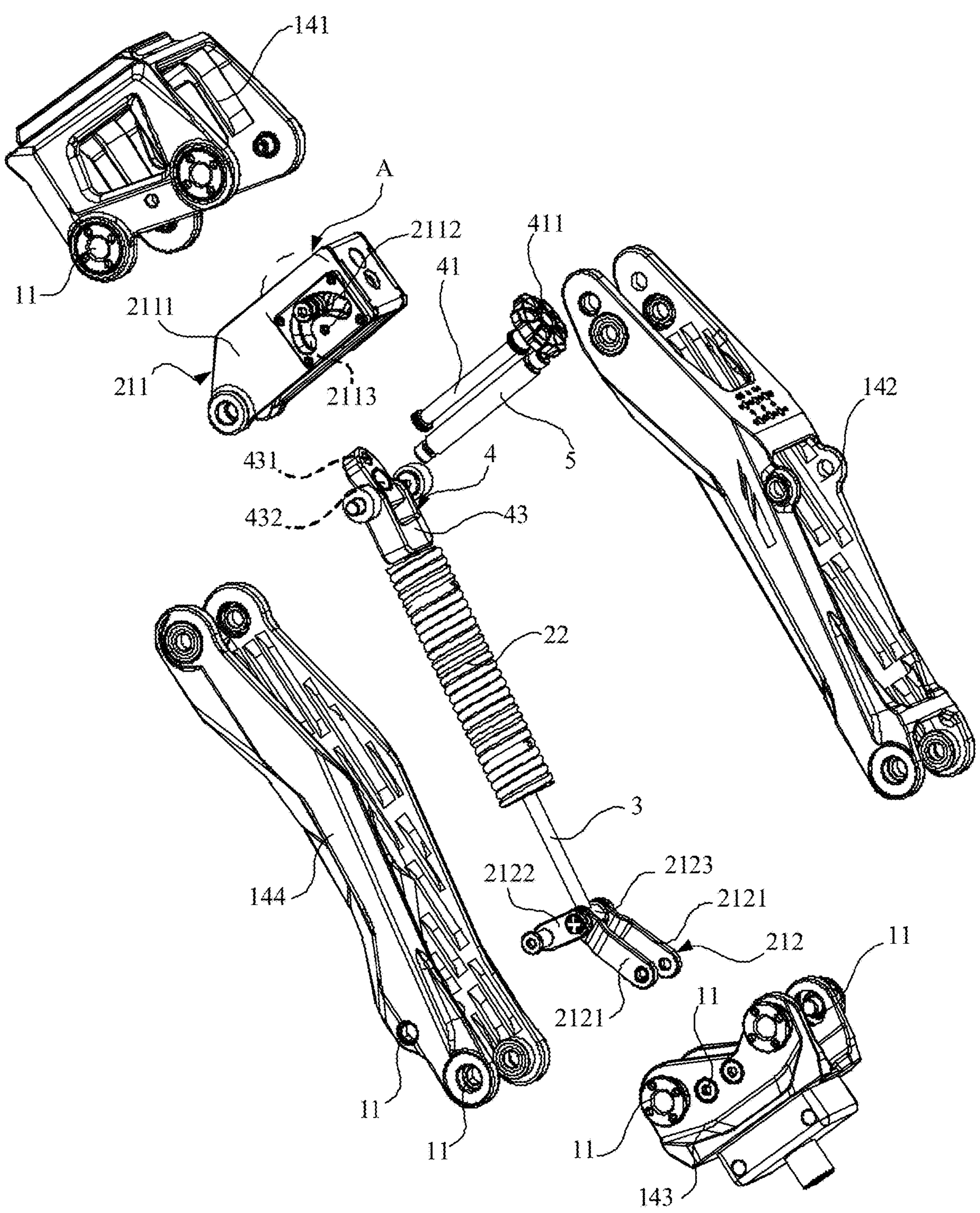
FIG. 4 is a diagram illustrating an exploded view of the shock-absorption device of FIG. 1 according to some aspects of the disclosure.
Figure 5:
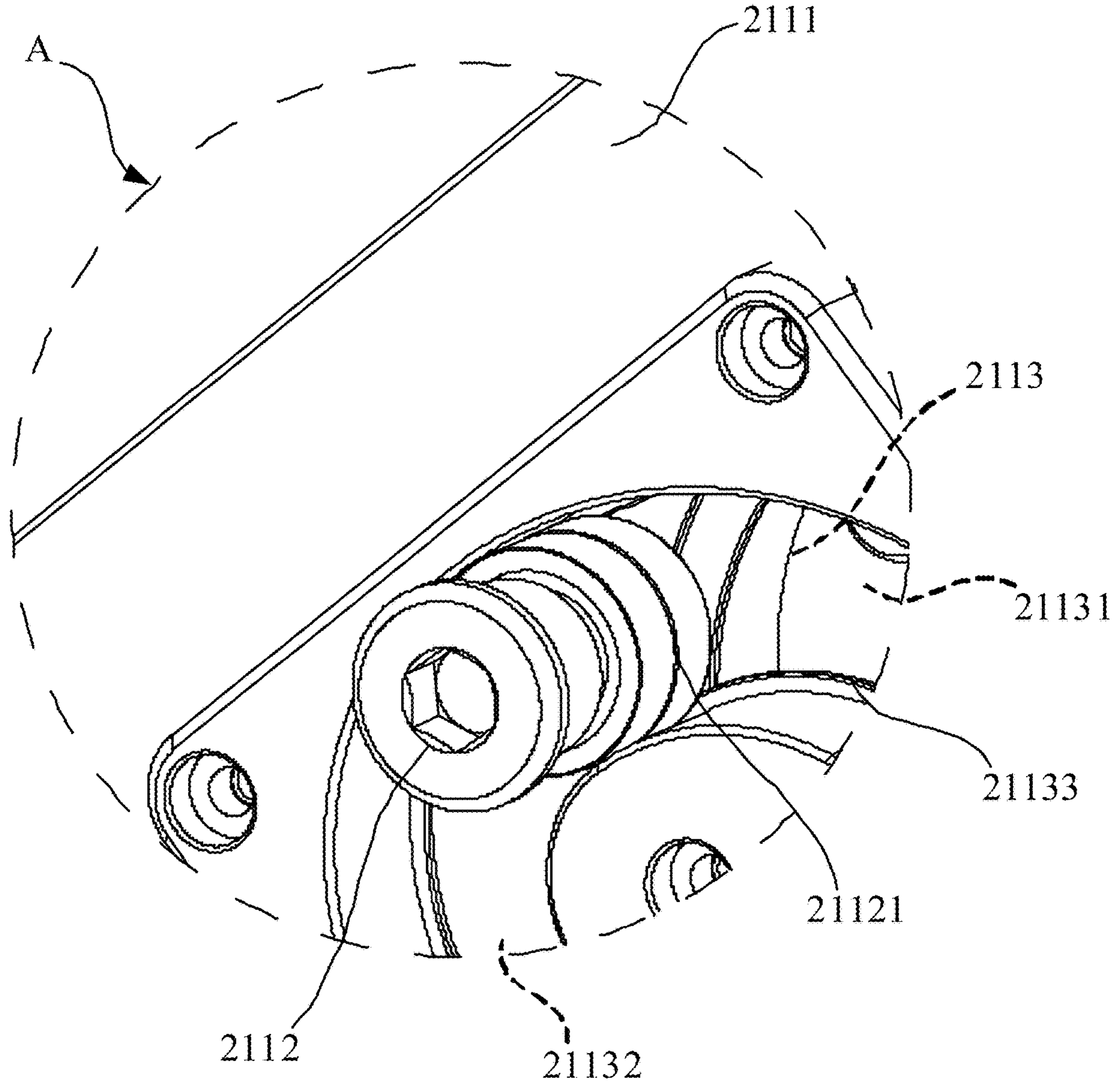
FIG. 5 is an enlarged diagram of the structure at position A in FIG. 4.

Referring to FIGS. 4 and 5. For instance, the sliding groove 2113 encompasses a first groove portion 21131 and a second groove portion 21132, both fashioned as eccentric circular arc paths. Alternatively, the first groove portion 21131 may be designed as an arc, whereas the second groove portion 21132 adopts an eccentric arc configuration.

In the first scenario, where a four-link assembly 14 is connected with movability, the swing component 2111 is attached to the first arm 141 of the four-link assembly 14, with one extremity distant from the second arm 142 of the linkage being movably linked to the fourth arm 144 (e.g. one end of the swinging component 2111, positioned away from a second arm 142 of the four-link assembly 14, is movably connected to a first arm 141 of the four-link assembly 14 via a fourth arm 144 of the four-link assembly 14). Additionally, one end of the second adjusting member 212 is movably connected to the third arm 143, while the opposite end is movably linked to the fourth arm 144. When the four-link assembly 14 swings downwards, thereby extending the clastic component 22, the sliding shaft 2112 glides along the first groove portion 21131, prompting the swing component 2111 to move in a direction that counteracts the extension of the elastic component 22. Conversely, when the four-link assembly 14 swings upwards to compress the elastic component 22, the sliding shaft 2112 traverses the second groove portion 21132, causing the swing component 2111 to pivot in a manner that aids in stretching the clastic component 22. In this embodiment, as the four-link assembly 14 descends, with the second arm 142 and fourth arm 144 rotating in a clockwise direction while the pivot 11 interconnecting the first arm 141 and third arm 143 rotates counterclockwise, the clastic component 22 experiences elongation. Concurrently, the sliding shaft 2112 traverses the first groove portion 21131, adhering to an eccentric circular trajectory. The varying radii within this eccentric path enable the swing component 2111 to pivot towards the elastic component 22, partially mitigating its extension and achieving a new equilibrium. This process finalizes the self-adjustment of the elastic component 22. Conversely, during the ascent of the four-link assembly 14, where the second arm 142 and fourth arm 144 rotate counterclockwise, and the pivot 11 joining the first arm 141 and third arm 143 rotates clockwise, the clastic component 22 contracts. Simultaneously, the sliding shaft 2112 glides into the second groove portion 21132, which is also designed as an eccentric circular path. The varying radii of this path allow the swing component 2111 to swing away from the clastic component 22, partially compensating for its contraction and restoring a new equilibrium, thereby completing the self-adjustment of the elastic component 22 and preventing excessive compression. It is important to clarify that the first arm 141, second arm 142, third arm 143, and fourth arm 144 are pivotally connected to each other in pairs via the pivots 11. In this context, "stretching" pertains to the tendency of the elastic component 22 to expand during the downward motion of the four-link assembly 14, whereas "contracting" refers to its tendency to compress during the upward movement motion of the four-link assembly 14.

Considering the scenario where both the first groove portion 21131 and the second groove portion 21132 adopt eccentric circular trajectories, a potential inflection point may arise at their intersection. In an alternative embodiment, another design is introduced where the first groove portion 21131 is configured as an arc, whereas the second groove portion 21132 is configured as an eccentric arc. This arrangement integrates the first groove portion 21131 with the end of the second groove portion 21132, forming a continuous arc trajectory, thereby eliminating the inflection point between the two portions. Notably, the movable frame 1 includes the four-link assembly 14, which is connected with movability. The swing component 2111 is movably attached to the first arm 141 of the four-link assembly 14, with one extremity distant from the second arm 142 of the linkage being movably linked to the fourth arm 144. Additionally, one end of the second adjusting member 212 is movably connected to the third arm 143, while the opposite end is movably linked to the fourth arm 144. When the four-link assembly 14 swings downwards, thereby extending the clastic component 22, the sliding shaft 2112 glides along the first groove portion 21131, prompting the swing component 2111 to move in a direction that counteracts the extension of the elastic component 22. Conversely, when the four-link assembly 14 swings upwards to compress the elastic component 22, the sliding shaft 2112 traverses the second groove portion 21132, causing the swing component 2111 to pivot in a manner that aids in stretching the elastic component 22. In this embodiment, during the ascent of the four-link assembly 14, where the second arm 142 and fourth arm 144 rotate counterclockwise, and the pivot 11 joining the first arm 141 and third arm 143 rotates clockwise, the elastic component 22 contracts. Simultaneously, the sliding shaft 2112 glides into the second groove portion 21132, which is also designed as an eccentric circular path. The varying radii of this path allow the swing component 2111 to swing away from the clastic component 22, partially compensating for its contraction and restoring a new equilibrium, thereby completing the self-adjustment of the elastic component 22 and preventing excessive compression. In this embodiment, as the four-link assembly 14 descends, with the second arm 142 and fourth arm 144 rotating in a clockwise direction while the pivot 11 interconnecting the first arm 141 and third arm 143 rotates counterclockwise, the elastic component 22 experiences elongation. Concurrently, the sliding shaft 2112 traverses the first groove portion 21131, adhering to an eccentric circular trajectory. Given the uniformity of arc radii, the sliding motion of the sliding shaft 2112 within the first groove portion 21131 does not induce the swing component 2111 to pivot towards the elastic component 22. It is understood that, in this context, "stretching" pertains to the tendency of the elastic component 22 to expand during the downward motion of the four-link assembly 14, whereas "contracting" refers to its tendency to compress during the upward movement motion of the four-link assembly 14.

Specifically, sliding grooves 2113 are positioned on both flanks of the swing component 2111. As the four-link assembly 14 rotates, the sliding shafts 2112 work in unison to facilitate a simultaneous swing motion of the swing component 2111 from both sides, enhancing the uniformity of movement. To ensure the stability of the sliding shafts 2112, sliding wheels 21121 can be mounted at their extremities, and limiting protrusions 21133 are incorporated within the sliding grooves 2113, constraining the sliding wheels 21121 within their designated paths and preventing inadvertent dislodgement.

Referring to FIGS. 2, 4, and 6-8. In this example, the second adjusting member 212 includes a first connecting rod 2121 and a second connecting rod 2122, which are pivotally joined at one end and connected to the movable frame 1 at the other ends. The clastic component 22 is positioned at the juncture of the first connecting rod 2121 and the second connecting rod 2122. As the movable member undergoes rotation, the first and second connecting rods 2121, 2122 rotate relative to each other, thereby altering the length of the elastic component 22. The movement trajectories of the first connecting rod 2121 and the second connecting rod 2122 are designed with flexibility to meet specific requirements, ensuring that as the movable frame 1 rotates, the elastic component 22 either contracts or stretches in harmony with the frame's movement. During contraction, the relative rotation between the first and second connecting rods 2121, 2122 causes their junction to displace away from the elastic component 22, effectively stretching the elastic component in the opposite direction to regulate its length and prevent undue contraction. This design not only cushions the elastic component 22 to a certain extent but also enhances its balancing capabilities to accommodate the elastic strain rate of the component. Conversely, during stretching, the relative rotation of the connecting rods 2121, 2122 brings their junction closer to the elastic component 22, resulting in its contraction in the opposite direction to adjust the length of the elastic component 22 and prevent excessive stretching. This design not only cushions the elastic component 22 to a certain extent but also enhances its balancing capabilities to accommodate the elastic strain rate of the component.

Figure 6:
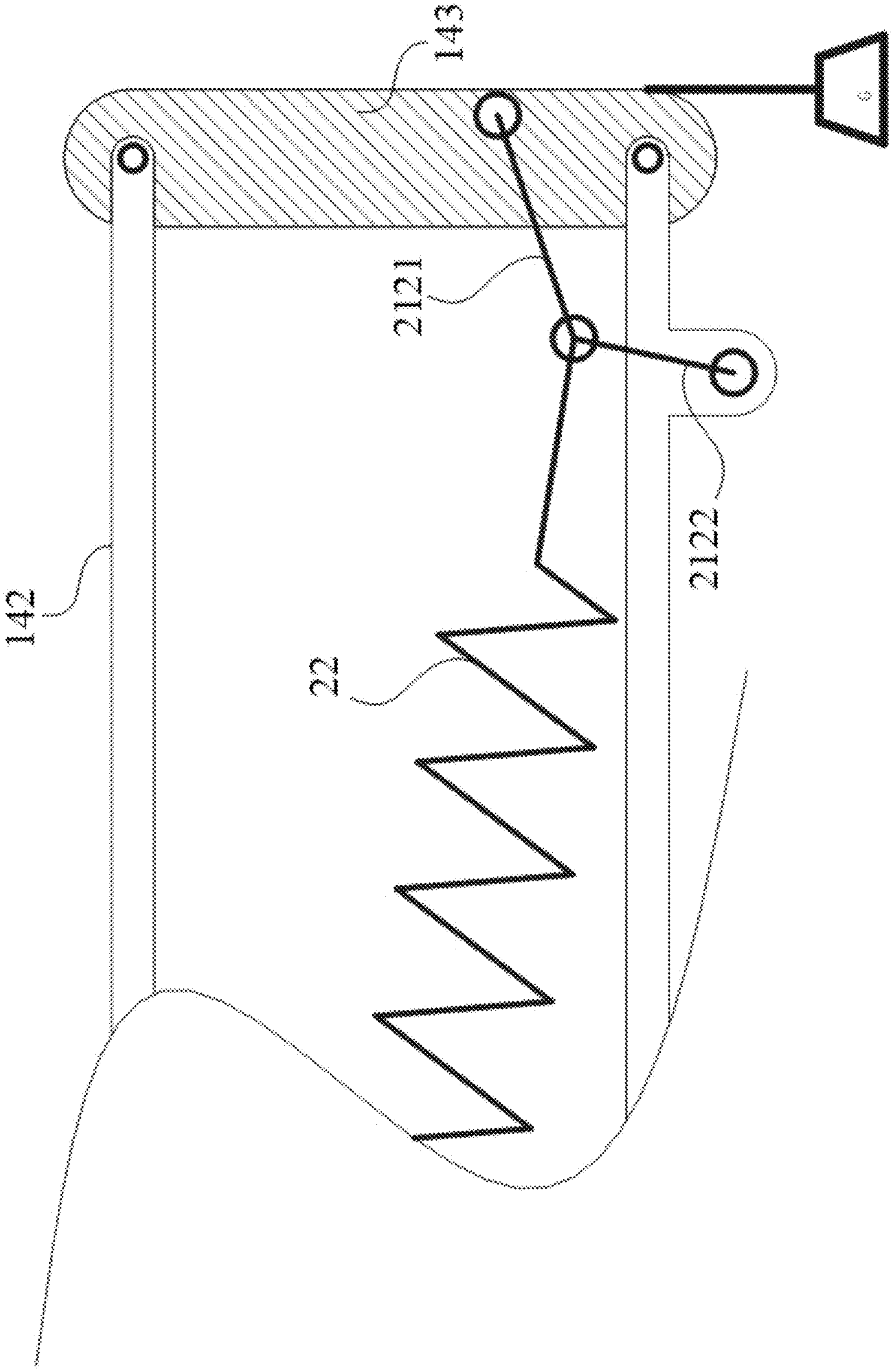
FIG. 6 is a state diagram of a second adjusting member during static balance according to some aspects of the disclosure.
Figure 7:
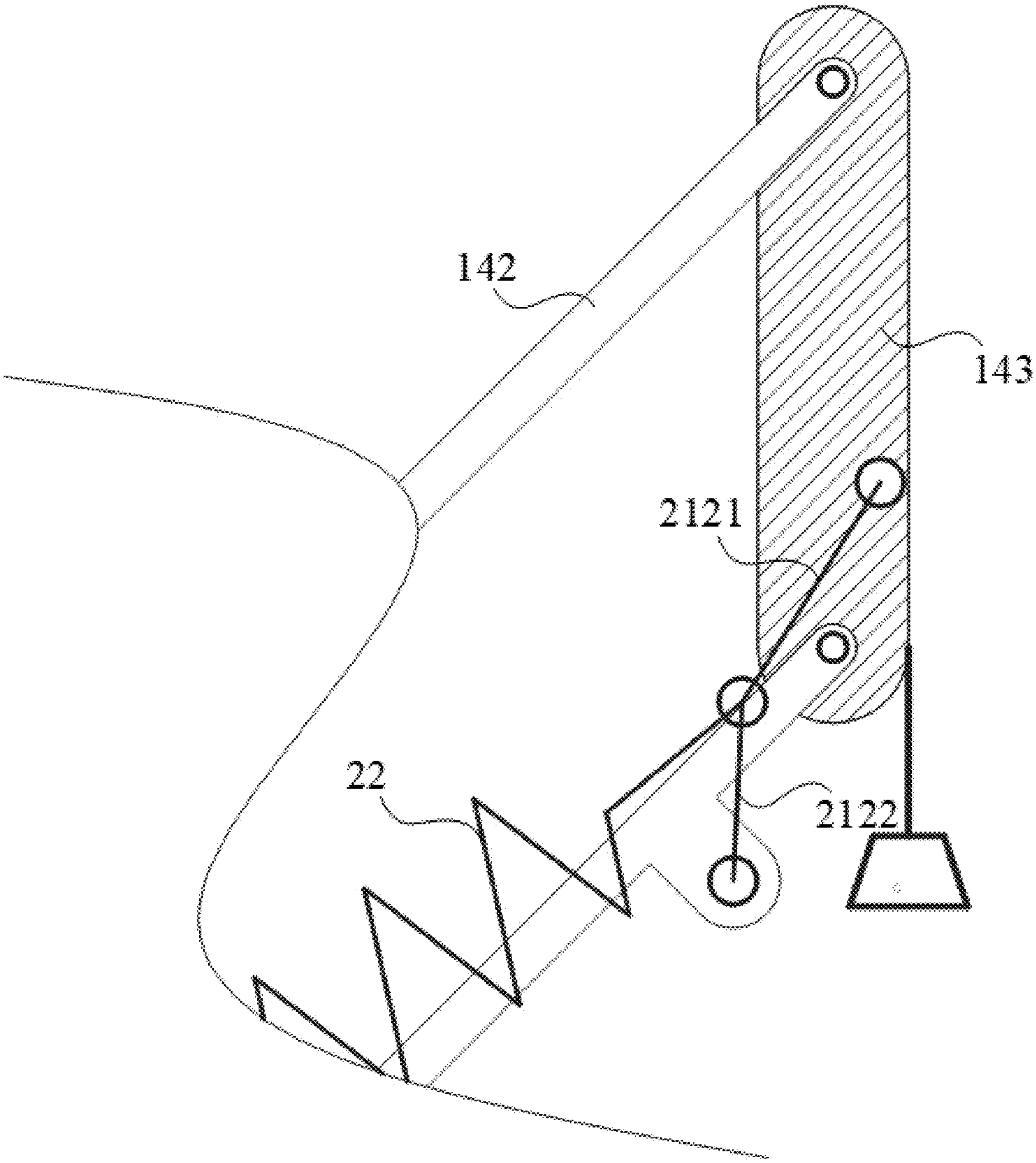
FIG. 7 is a state diagram of the second adjusting member when a movable frame is tilted upwards according to some aspects of the disclosure.
Figure 8:
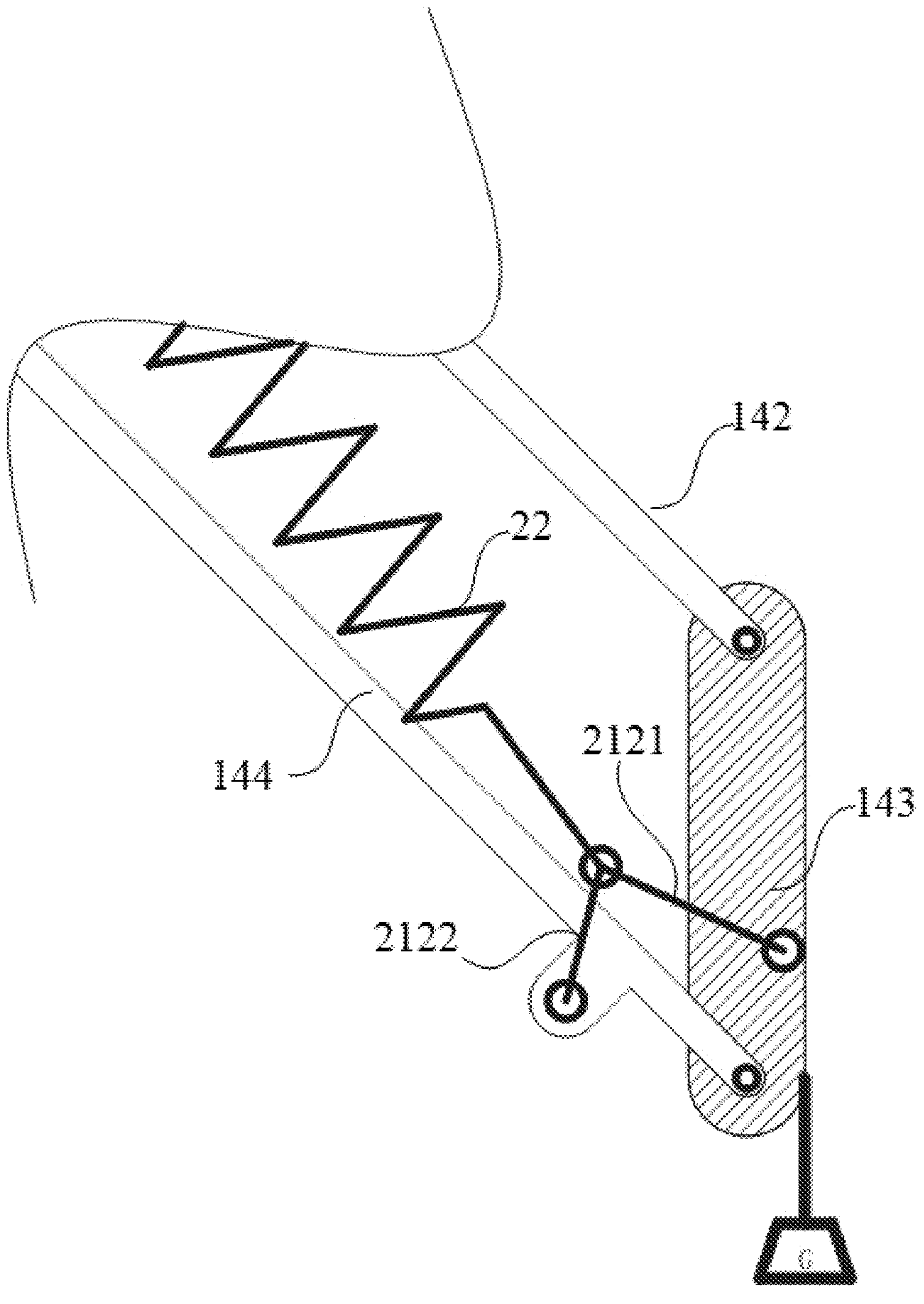
FIG. 8 is a state diagram of the second adjusting member when the movable frame is tilted downwards according to some aspects of the disclosure.

For a more detailed understanding, referring to FIGS. 6-8, the movable frame 1 incorporates the four-link assembly 14, which is connected with movability. The swing component 2111 is movably attached to the first arm 141 of the four-link assembly 14, with one extremity distant from the second arm 142 of the linkage being movably linked to the fourth arm 144. One end of the first connecting rod 2121, apart from its junction with the second connecting rod 2122, is movably attached to the third arm 143 of the four-link assembly 14. Similarly, one end of the second connecting rod 2122, apart from its junction with the first connecting rod 2121, is movably connected to the fourth arm 144 of the four-link assembly 14. When the four-link assembly 14 swings downwards, inducing the stretching of the clastic component 22, the third and fourth arms 143, 144 respectively drive the first and second connecting rods 2121, 2122 to rotate, causing their junction to move in a direction that contracts the elastic component 22. Conversely, when the four-link assembly 14 swings upwards to contract the elastic component 22, the same arms 143, 144 actuate the connecting rods 2121, 2122 to rotate, positioning their junction in a direction that stretches the elastic component 22. In this example, during the ascent of the four-link assembly 14, where the second arm 142 and fourth arm 144 rotate counterclockwise, and the pivot 11 joining the first arm 141 and third arm 143 rotates clockwise, the elastic component 22 contracts. The first connecting rod 2121 rotates clockwise along the pivot 11 joining the third arm 143, the second connecting rod 2122 rotates clockwise along the pivot 11 joining the fourth arm 144, allowing the junction of the first connecting rod 2121 and the second connecting rod 2122 to swing away from the elastic component 22, partially compensating for its contraction and reaching a new equilibrium, thereby completing the self-adjustment of the elastic component 22 and preventing excessive compression. In this example, during the downward movement of the four-link assembly 14, where the second arm 142 and fourth arm 144 rotate clockwise, and the first arm 141 and third arm 143 rotates counterclockwise, the elastic component 22 contracts. The first connecting rod 2121 rotates clockwise along the pivot 11 joining the third arm 143, the second connecting rod 2122 rotates counterclockwise along the pivot 11 joining the fourth arm 144, allowing the junction of the first connecting rod 2121 and the second connecting rod 2122 to swing closer to the elastic component 22, partially compensating for its contraction and reaching a new equilibrium, thereby completing the self-adjustment of the elastic component 22 and preventing excessive compression. It is noteworthy that the aforementioned clockwise and counterclockwise directions are relative to the viewpoint presented in FIG. 2, and these rotational directions will adjust accordingly with changes in perspective.

In some aspects, the first adjusting member 211 and the second adjusting member 212 offer flexibility in their combination. For example, the first adjusting member 211 can include a swing component 2111 and a sliding shaft 2112, while the second adjusting member 212 can include a swing component 2111 and a sliding shaft 2112, or alternatively, both components can be configured as the first connecting rod 2121 and the second connecting rod 2122, or any combination of these components, and so forth.

Moreover, the damping performance of the shock-absorption device 10 can diminish as the load increases. To address this limitation, referring to FIGS. 3 and 4. A first force adjustment assembly 3 is positioned at the end of the elastic component 22, distal from the first adjusting member 211, with the end of the first force adjustment assembly 3, distal from the elastic component 22, connected to the second adjusting member 212. This first force adjustment assembly 3, situated between the elastic component 22 and the second adjusting member 212, serves to fine-tune the load-bearing characteristics of the shock-absorption structure. For example, it enables the shock-absorption device to accommodate varying weights of loads by adjusting the first force adjustment assembly 3. Specifically, the first force adjustment assembly 3 and the elastic component 22 are interconnected in an adjustable manner, allowing for the relative positioning between them to be modified. By adjusting this relative position, the load-bearing capacity of the elastic component 22 can be tailored to suit different load objects. Furthermore, the first force adjustment assembly 3 is inserted into the elastic component 22, enabling the adjustment of their relative positions to achieve varying inclination angles of the elastic component 22. This feature allows the shock-absorption device to effectively support a wider range of load objects, including but not limited to photographic equipment.

Specifically, multiple instances of the first connecting rod 2121 and the second connecting rod 2122 are provided, with two rods serving as illustrative examples in this embodiment. A connecting shaft 2123 is positioned at the end of the first force adjustment assembly 3 which is distal from the elastic component 22. Both ends of the connecting shaft 2123 are connected to one first connecting rod 2121 and one second connecting rod 2122, respectively, ensuring that the ends of these rods are penetrated by the connecting shaft 2123. This configuration enables the four-link assembly 14, upon rotation, to drive the first and second connecting rods 2121, 2122 attached to the connecting shaft 2123 to rotate concurrently. The two first connecting rods 2121 and the single second connecting rod 2122, acting synergistically on the clastic component 22 from opposing sides, facilitate adaptive length adjustment of the elastic component 22, thereby enhancing uniformity of motion.

In an alternative embodiment, a second force adjustment assembly 4 can be placed at the end of the elastic component 22 which is apart from the second adjusting member 212. This force adjustment assembly includes an adjusting member 41 and a connector 43. The adjusting member 41 is mounted on the first adjusting member 211, while one end of the connector 43 is attached to the elastic component 22, and its other end is slidably engaged with the adjusting member 41. By positioning the second force adjustment assembly 4 between the elastic component 22 and the first adjusting member 211, it becomes a tool for adjusting the load-bearing conditions of the shock-absorbing structure. For instance, adjustments can be made to accommodate loads of varying weights by manipulating the second force adjustment assembly 4. Specifically, the second force adjustment assembly 4 and the adjusting member 41 are designed for adjustable interconnection. Depending on the required positioning, the relative positions of the adjusting member 41 and the second force adjustment assembly 4 can be fine-tuned to modulate the initial load force imparted on the elastic component 22, enabling adaptability to a wide range of load objects. Specifically, a rotating portion 411 is incorporated into the adjusting member 41, with an external thread running along its surface. The adjustment member 41 is securely inserted into the swing component 2111. Meanwhile, the connector 43 features a first mounting hole 431, lined with internal threads, which enables a threaded connection with the adjustment member 41 via the first mounting hole 431. By altering the mounting position of the connector 43 along the adjusting member 41, various angles are formed between the elastic component 22 and the adjusting member 41, each angle corresponding to a distinct elastic force output by the elastic component 22, thereby accommodating loads of varying weights.

Additionally, the connector 43 can incorporate a second mounting hole 432. The shock-absorption device 10 can further include a rod body 5, mounted on the swing component 2111 and inserted through the second mounting hole 432. This configuration fortifies the overall installation stability of the device.

It is emphasized that the aforementioned embodiments serve as preferred illustrations and do not constitute limitations on the scope of the patent claims presented herein. Any structural modifications that are deemed equivalent, based on the disclosure and drawings of this application, or their direct/indirect application in related technical domains, fall within the ambit of patent protection afforded to this application, in line with its underlying concept.

What is claimed is:

1. A self-adjusting shock-absorption device, comprising:

a movable frame configured to rotate along at least one pivot; the movable frame comprises a four-link assembly that comprises a first arm, a second arm, a third arm, and a fourth arm; and a shock-absorption mechanism, comprising an adjusting component and an elastic component, the adjusting component comprises a first adjusting member and a second adjusting member;

wherein the first adjusting member is movably connected to the four-link assembly, and the second adjusting member is movably connected to the four-link assembly; the elastic component is provided within the four-link assembly, with a first end of the elastic component connected to the first adjusting member, a second end of the elastic component connected to the second adjusting member;

and in response to a rotation of the four-link assembly, the first adjusting member and the second adjusting member undergo dynamic motion to change a length of the elastic component.

2. The self-adjusting shock-absorption device according to claim 1, wherein the first adjusting member comprises a swinging component and a sliding shaft;

wherein the swinging component is movably connected to the movable frame and connected to the elastic component;

wherein the swinging component comprises a sliding groove;

wherein a first end of the sliding shaft is connected to the movable frame, and a second end of the sliding shaft is configured to slide within the sliding groove; and wherein the sliding shaft is configured to rotate along the sliding groove, driving the swinging component to pivot and thereby altering a length of the elastic component, in response to a rotation of the movable frame.

3. The self-adjusting shock-absorption device according to claim 2, wherein the sliding groove comprises a first groove portion in an arc shape and a second groove portion in an eccentric arc shape.

4. The self-adjusting shock-absorption device according to claim 3, wherein an end of the swinging component, positioned away from the second arm of the four-link assembly, is movably connected to the first arm of the four-link assembly via the fourth arm of four-link assembly;

wherein a first end of the second adjusting member is movably connected to the third arm of the four-link assembly, and a second end of the second adjusting member is connected to the fourth arm of the four-link assembly;

wherein, in response to the four-link assembly swinging downwards, stretching the elastic component, the sliding shaft is configured to move into the first groove portion; and wherein, in response to the four-link assembly swinging upwards, contracting the elastic component, the sliding shaft is configured to move into the second groove portion, causing the swinging component to pivot in a direction that further stretches the elastic component.

5. The self-adjusting shock-absorption device according to claim 2, wherein the sliding groove comprises a first groove portion in an eccentric arc shape and a second groove portion in an eccentric arc shape.

6. The self-adjusting shock-absorption device according to claim 5, wherein the movable frame comprises a four-link assembly movably that comprises a first arm, a second arm, a third arm, and a fourth arm;

wherein an end of the swinging component, positioned away from the second arm of the four-link assembly, is movably connected to the first arm of four-link assembly via the fourth arm of four-link assembly;

wherein a first end of the second adjusting member is movably connected to the third arm of the four-link assembly, and a second end of second adjusting member is connected to the fourth arm of the four-link assembly;

wherein, in response to the four-link assembly swinging downwards, stretching the elastic component, the sliding shaft is configured to move into the first groove portion, driving the swinging component to move in a direction of compressing the elastic component; and wherein, in response to the four-link assembly swinging upwards, compressing the elastic component, the sliding shaft is configured to move into the second groove portion, prompting the swinging component to pivot in a direction that further stretches the elastic component.

7. The self-adjusting shock-absorption device of claim 2, wherein the second adjusting member comprises a first connecting rod and a second connecting rod;

wherein a first end of the first connecting rod and a first end of the second connecting rod are interconnected with a rotating connection, and a second end of the first connecting rod and a second end of the second connecting rod is respectively connected to the movable frame;

wherein the elastic component is connected at a juncture point connecting the first connecting rod and the second connecting rod; and wherein, in response to a rotation of the movable frame, the first connecting rod and the second connecting rod are configured to undergo relative rotation, subsequently altering a length of the elastic component.

8. The self-adjusting shock-absorption device according to claim 7, wherein the movable frame comprises a four-link assembly that comprises a first arm, a second arm, a third arm, and a fourth arm;

wherein one end of the swinging component, positioned away from the second arm of the four-link assembly, is movably connected to the first arm of the four-link assembly via the fourth arm of the four-link assembly;

wherein one end of the first connecting rod, distanced from the second connecting rod, is movable attached to the third arm of the four-link assembly;

wherein one end of the second connecting rod, distanced from the first connecting rod, is movably connected to the fourth arm of the four-link assembly;

wherein, in response to the four-link assembly swinging downwards, expanding the elastic component, the third arm and the fourth arm facilitate the rotation of the first connecting rod and the second connecting rod, causing the juncture point to shift in a direction that compresses the elastic component; and, wherein, in response to the four-link assembly swinging upwards, contracting the elastic component, the third arm and the fourth arm are configured to drive the rotation of the first connecting rod and the second connecting rod, resulting in the juncture point moving towards a position that elongates the elastic component.

9. The self-adjusting shock-absorption device according to claim 1, further comprising a first force adjustment assembly positioned at a first end of the elastic component, remote from the first adjusting member;

wherein a second end of the first force adjustment assembly, remote from the elastic component, is connected to the second adjusting member.

10. The self-adjusting shock-absorption device according to claim 1, further comprising a second force adjustment assembly situated at one end of the elastic component, remote from the second adjusting member;

wherein the second force adjustment assembly comprises a third adjusting member positioned on the first adjusting member, and a connector with a first end firmly attached to the elastic component and a second end movably engaged around the third adjusting member.

11. A self-adjusting shock-absorption device, comprising:

a movable frame configured to rotate along at least one pivot; the movable frame comprises a four-link assembly that comprises a first arm, a second arm, a third arm, and a fourth arm; and a shock-absorption mechanism, comprising an adjusting component and an elastic component, the adjusting component comprises a second adjusting member;

wherein a first end of the second adjusting member is movably connected to the elastic component, a second end of the second adjusting member is movably connected to is movably connected to the third arm; and a third end of the second adjusting member is movably connected to is movably connected to the third arm; and wherein the second adjusting member is configured to change a length of the elastic component in response to a rotation of the four-link assembly.

12. The self-adjusting shock-absorption device according to claim 11, the second adjusting member comprises a first connecting rod and a second connecting rod;

wherein a first end of the first connecting rod and a first end of the second connecting rod are interconnected with a rotating connection, and a second end of the first connecting rod and a second end of the second connecting rod is respectively connected to the third arm and the fourth arm; wherein the elastic component is connected at a juncture point connecting the first connecting rod and the second connecting rod; and wherein, in response to a rotation of the movable frame, the first connecting rod and the second connecting rod are configured to undergo relative rotation, subsequently altering a length of the elastic component.

* * * * *